Dec. 3, 1940.  H. M. B. RUCKER  2,223,809

APPARATUS FOR APPLYING LIQUID INSECTICIDE TO PLANTS

Filed June 20, 1939  2 Sheets-Sheet 1

Inventor

Harold Mack Bride Rucker

By B. M. Wilburn
Attorney

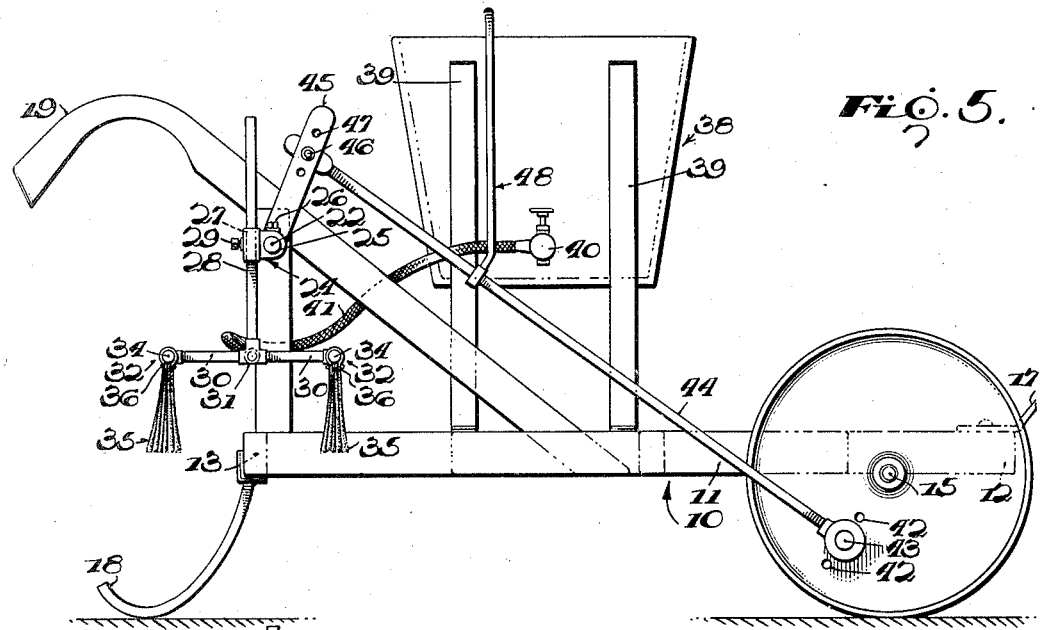

Patented Dec. 3, 1940

2,223,809

UNITED STATES PATENT OFFICE 2,223,809

APPARATUS FOR APPLYING LIQUID INSECTICIDE TO PLANTS

Harold Mack Bride Rucker,
St. Matthews, S. C.

Application June 20, 1939, Serial No. 280,160

11 Claims. (Cl. 299—29)

My invention relates to apparatus for applying liquid insecticide to plants, such as cotton or the like.

An important object of the invention is to provide means for effectively applying the liquid insecticide to the lower surfaces of the leaves of the plant.

A further object of the invention is to provide a reciprocatory device which will rub against one side of the plant while moving upwardly, tending to turn the leaves of the plant for applying the insecticide to their lower surfaces, and will then rub upon the opposite side of the plant while moving upwardly, tending to turn the leaves for applying the insecticide to the lower surfaces of such leaves.

A further object of the invention is to provide apparatus of the above mentioned character which will apply the insecticide in a thorough and economical manner.

A further object of the invention is to provide apparatus of the above mentioned character which is adjustable for use in connection with plants of different heights and with plants in rows spaced different distances apart.

A further object of the invention is to provide simple means for maintaining the liquid insecticide properly agitated to prevent settling out of the solid constituents.

Other objects and advantages of the invention will be apparent during the course of the following description.

Figure 1:
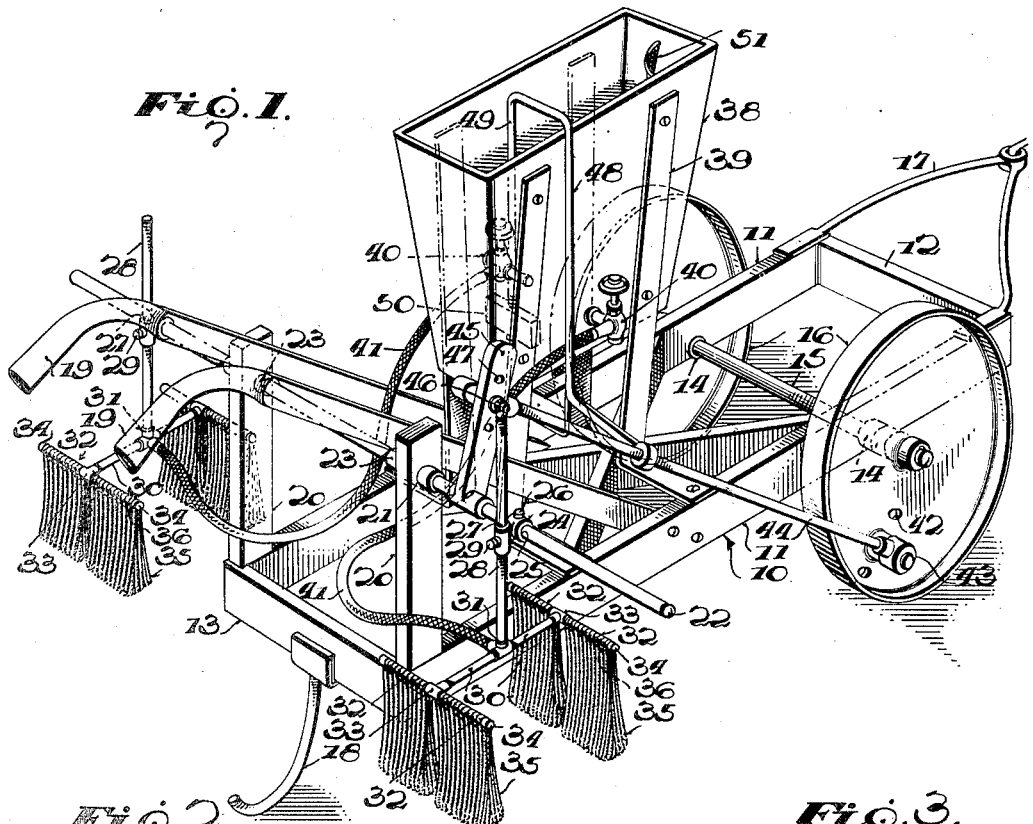
Figure 2:
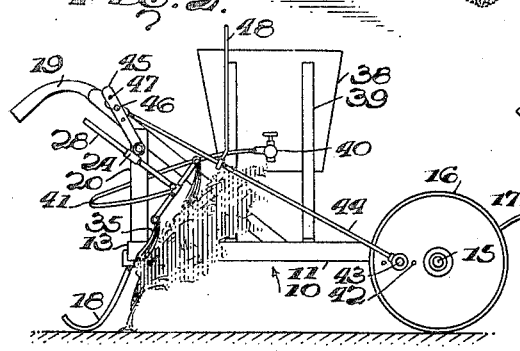
Figure 3:
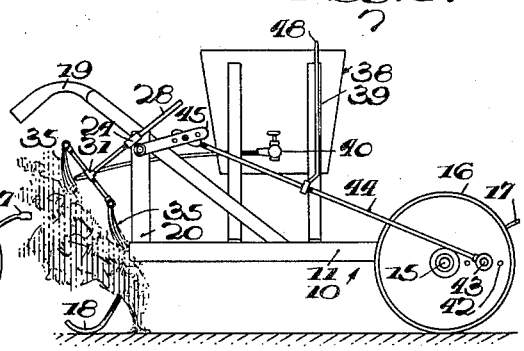
Figure 4:
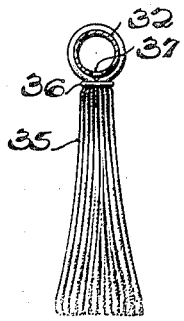

In the accompanying drawings forming a part of this application and in which like numerals are employed to designate like parts throughout the same, Figure 1 is a perspective view of apparatus embodying our invention, Figure 2 is a side elevation of the apparatus, showing the liquid insecticide applying device moving upwardly upon the rear side of the plant, Figure 3 is a similar view showing the applying device moving upwardly upon the forward side of the plant, Figure 4 is a detailed section taken on line 4—4 of Figure 6, Figure 5 is a side elevation of the apparatus showing the insecticide applying device in the horizontal position, and, Figure 6 is a plan view of the apparatus.

In the drawings wherein for the purpose of illustration is shown a preferred embodiment of my invention the numeral 10 designates a main frame, including longitudinal horizontal beams 11, rigidly connected at their forward and rear ends by transverse beams 12 and 13. The beams 11 are provided near their forward ends with bearings 14, for receiving a transverse axle 15, carrying wheels 16, rotatable thereon. These wheels are arranged upon the outer sides of the main frame 10. A draw-bar or draft appliance 17 is suitably connected with the forward end of the main frame and may be drawn forwardly by a draft animal, a tractor or the like. The rear end of the main frame 10 is supported by a runner 18, rigidly attached to the transverse beam 13 and depending therefrom. A pair of handles 19 extend rearwardly beyond the frame 10 and are suitably attached to the frame 10.

Rigidly mounted upon the side beams 11 of the frame 10 near their rear ends are vertical beams or uprights 20, provided at their upper ends with bearings 21, receiving a horizontal transverse rock shaft 22, which is free to turn, but is held against longitudinal displacement by sleeves 23 or any other suitable means. This rock-shaft extends laterally outwardly upon the opposite sides of the main frame 10, for substantial distances, as shown.

The numeral 24 designates coupling elements or blocks which are mounted upon the end portions of the rock-shaft 22. Each coupling element has an opening 25 to receive the rock-shaft 22 and the coupling element 24 is longitudinally adjustable upon the rock shaft, and is clamped to the rock-shaft in the selected adjusted position by means of a bolt 26 or the like. The coupling element or block 24 also has a vertical opening 27, receiving a vertical rod 28, which is vertically adjustably mounted therein, and clamped in the selected adjusted position by means of a bolt 29 or the like. The liquid insecticide applying devices are carried by the vertical rods 28. It is thus seen that the rods 28 are adjustable horizontally toward and from each other, to compensate for the variance of distance between the rows of cotton plants or the like and also vertically adjustable to compensate for the different height of the cotton plants or the like.

Each vertical rod 28 carries at its lower end a liquid insecticide applying device, comprising a pipe including pipe sections 30, which are connected and placed in communication with each other by a T-coupling 31, also secured to the lower end of the rod 28. The pipe including the pipe sections extends longitudinally of the rows. At the outer ends of the pipe sections 30 are forward and rear pairs of pipe sections 32, which are connected by T-couplings 33 and are placed in communication with each other by such T- couplings. The T-couplings 33 are secured to the forward and rear ends of the pipe sections 30 and the pipe sections 30 are placed in communication with the pairs of pipe sections 32. The pairs of pipe sections 32 are horizontally arranged and extend transversely of the rows of plants. The ends of the pairs of pipe sections 32 are closed by caps 34, extending radially beyond the same and serving as stops for fibrous absorbent liquid insecticide applying elements 35. These elements 35 are preferably formed of mops, including the usual cords. The cords of the mops 35 are folded over the pipe sections 32 and are preferably stitched together beneath the pipe sections, as shown at 36. These mops are loosely mounted upon the pipe sections 32 and are capable of swinging thereon with relation thereto, but are held against moving off of the ends of the pipe sections by the caps 34. The pipe sections 32 are provided upon their lower sides with apertures 37, for the discharge of the liquid insecticide, the same passing to the interior of the mop elements 35 and being absorbed thereby.

Arranged above the main frame 10 is a tank or hopper 38, which is vertical, and preferably tapers downwardly and is rigidly mounted upon uprights 39, in turn rigidly mounted upon the side beams 11. Attached to the opposite sides of the tank 38 are adjustable valves 40, for regulating the discharge of the liquid insecticide from the hopper 38. Secured to these valves 40 are flexible conduits or hose 41, the discharge ends of which are connected with the inner sides of the T-couplings 31. There is sufficient slack in the hose 41 to permit of the reciprocatory movements of the liquid insecticide applying devices, as will be explained.

One wheel 16 is provided with a group of radially spaced openings 42, for receiving a pivot element or pin 43, having pivotal connection with a connecting rod 44, extending rearwardly and upwardly, and pivotally connected with a crank 45, by means of a pin 46, adapted for insertion within one of the selected openings 47. The crank 45 is rigidly mounted upon the rockshaft 22.

Clamped to the connecting rod 41 is an inverted U-shaped rod 48, having one arm 49 thereof extending downwardly into the tank 38, and having a paddle or agitator 50 rigidly secured thereto. This paddle or agitator is arranged on edge and extends transversely of the hopper and moves longitudinally of the same while rising and falling.

The tank 38 has a strainer 51 through which the liquid insecticide is supplied, thus preventing solid particles from entering the tank.

The operation of the machine is as follows:

The main frame 10 is moved forwardly between two rows of cotton plants or the like and of course is guided in such movement by the handles 19, as is obvious. The rock-shaft 22 extends beyond the opposite sides of the frame 10 and extends over the pair of rows of cotton or the like. The rods 28 are properly adjusted both horizontally and vertically, so that the liquid insecticide applying devices will properly engage with the rows of cotton plants or the like. As the machine travels forwardly between the rows, the rotation of the wheel 16 is imparted to the shaft 22 through the medium of the connecting rod 44 and the shaft 22 is rocked back and forth, reciprocating or oscillating the rods 28. In the starting position, the liquid insecticide applying device is substantially horizontal and is in the lowermost position. As the machine advances this device swings forwardly and at the same time rises. This action causes the mop elements 35 to wipe against the trailing side of the cotton plant or the like, which wiping action of the mop elements while they are moving forwardly and upwardly turns the leaves of the plant so that the liquid insecticide is properly applied to the lower surfaces of the leaves. This action is aided by the fact that the mop elements are free to swing upon the pipe sections 32 and can more readily adjust themselves to the contour of the plant. The continued turning of the wheel 16 now causes the liquid insecticide applying device to be swung rearwardly and upwardly whereby the mop elements drag across the leading side of the same plant, turning the leaves upwardly and applying the liquid insecticide to the lower surfaces of the leaves. It is thus seen that the insecticide applying device reciprocates in a curved path or oscillates, thereby rising and falling during its reciprocation, which affects a proper wiping action between the mop elements and the leaves of the plant, from the bottom of the plant to its top. The liquid insecticide is applied to the mop elements in a sufficient amount to keep the same properly saturated with the liquid insecticide whereby the mop elements will apply the liquid insecticide to the leaves without loss of the insecticide.

It is to be understood that the form of our invention is to be taken as a preferred example of the same and that various changes in the shape, size, and arrangement of parts, may be resorted to without departing from the spirit of my invention or the scope of the subjoined claims.

Having thus described my invention, what I claim is:

1. In an apparatus for applying a liquid insecticide to cotton plants or the like, a support, a liquid insecticide applying device carried by the support, and means other than the plant to swing the device upwardly to engage one side of the plant and subsequently swing the device upwardly in an opposite direction to engage the other side of the plant.

2. In an apparatus for applying a liquid insecticide to cotton plants or the like, a support, an oscillating member pivotally mounted upon the support to swing longitudinally of the row of plants, flexible absorbent elements carried by the member, and means other than the plant to swing the member in opposite directions while engaging the plant.

3. In an apparatus for applying liquid insecticide to cotton plants or the like, a support, a member, means to pivotally mount the member upon the support at an elevation near the tops of the plants, the member swinging longitudinally of the rows of the plants, the member extending downwardly below the pivot means, flexible absorbent elements mounted upon the lower end of the member, the flexible absorbent elements extending transversely of the row and spaced longitudinally with relation to the row, means for applying the liquid insecticide to the absorbent elements, and means other than the plant to swing the member in opposite directions while engaging the plant.

4. In an apparatus for applying liquid insecticide to cotton plants or the like, a support to travel longitudinally of the row, a rock shaft mounted upon the support and extending transversely thereof, a rod mounted upon the rock shaft and depending below the same, supporting elements connected with the lower end of the rod and spaced therefrom and spaced longitudinally of the row, flexible absorbent elements mounted upon the supporting element, and means to supply a liquid insecticide to the flexible absorbent elements, and means other than the plant to turn the rock shaft in opposite directions to move the absorbent elements in opposite directions while contacting with the plant.

5. In an apparatus for applying liquid insecticide to cotton plants or the like, a support to travel longitudinally of the row, a rock shaft mounted upon the support and extending transversely thereof, a rod mounted upon the rock shaft and extending below the same, supporting elements arranged transversely of the row and spaced from each other in a direction longitudinally of the row, means to mount the transverse supporting elements upon the depending rod, flexible absorbent elements mounted upon the transverse supporting elements, means to supply the liquid insecticide to the flexible absorbent elements, and means other than the plant to turn the rock shaft in opposite directions upon its longitudinal axis for causing the flexible absorbent elements to move in opposite directions while engaging the plants.

6. In an apparatus for applying liquid insecticide to cotton plants or the like, a support to travel longitudinally of the row, a rock shaft mounted upon the support at an elevation generally near the top of the plants and extending transversely of the support, a rod mounted upon the rock shaft and extending below the same, apertured pipes arranged transversely of the row and spaced from each other in a direction longitudinally of the row, means to mount the apertured pipes upon the lower end of the rod, means for supplying a liquid insecticide to the pipes, and flexible absorbent elements mounted upon the pipes.

7. In an apparatus for applying a liquid insecticide to cotton plants or the like, a support, wheels carrying the support, a rock shaft extending transversely of the support and mounted thereon, means connecting one wheel of the rock shaft so that rotation of the wheel turns the rock shaft upon its longitudinal axis in opposite directions, a rod mounted upon the rock shaft and extending below it, a pipe connected with the lower end of the rod and extending longitudinally of the row, pipes extending transversely of the row and connected with the first named pipe near its ends, the transverse pipes being spaced in a direction longitudinally of the row, a tank mounted upon the support for holding a liquid insecticide, and a flexible conduit connecting the tank with the longitudinal pipe.

8. In an apparatus for applying a liquid insecticide to cotton plants or the like, a support, wheels carrying the support, uprights mounted upon the support, a rock shaft carried by the uprights and extending transversely of the support and beyond the opposite sides of the support, rods arranged upon opposite sides of the support and adjustably mounted upon the rock shaft and extending below the same, longitudinal pipes connected with the lower ends of the rods, spaced transverse pipes mounted upon each longitudinal pipe, flexible absorbent elements mounted upon the transverse pipes, a tank mounted upon the support, flexible hose connecting the tank and longitudinal pipes, a crank mounted upon the rock shaft, and a connecting rod between one wheel and the crank.

9. In an apparatus for applying a liquid insecticide to cotton plants or the like, a support, wheels carrying the support, a rock shaft mounted upon the support, a crank mounted upon the rock shaft, a connecting rod between the crank and one wheel, a supporting device mounted upon the rock shaft, flexible absorbent elements mounted upon the supporting device, a tank mounted upon the support, a hose connected with the tank for supplying the liquid insecticide to the flexible absorbent elements, a rod mounted upon the connecting rod and having a part extending downwardly into the tank, and an agitator within the tank and attached to said part.

10. In an apparatus for applying a liquid insecticide to cotton plants or the like, a flexible absorbent element, means for supporting the flexible absorbent element, means to convey the supporting means longitudinally of the row of plants, and means to swing the flexible absorbent element upwardly in a forward direction when engaging the rear side of the plant and upwardly and in a rear direction when engaging the forward side of the plant.

11. In an apparatus for applying a liquid insecticide to cotton plants or the like, a plurality of flexible absorbent elements spaced in a direction longitudinally of the row of plants, means for supporting the elements in a lowered position, means to convey the elements longitudinally of the row, means to swing the elements upwardly and forwardly while contacting with the rear side of the plant and then swinging the elements upwardly and rearwardly when contacting with the forward side of the plant, and means for supplying a liquid insecticide to the absorbent elements.

HAROLD MACK BRIDE RUCKER.